United States Patent [19]

Yukuta et al.

[11] 4,076,654

[45] Feb. 28, 1978

[54] PROCESS FOR PRODUCING A FLAME- AND SMOKE-RETARDED, NON-SHRINKABLE, FLEXIBLE POLYURETHANE FOAM

[75] Inventors: Toshio Yukuta, Kodaira; Takashi Ohashi, Iruma; Minoru Kojima, Kodaira; Akira Suzuki, Higashi-Murayama, all of Japan

[73] Assignee: Bridgestone Tire Company Limited, Tokyo, Japan

[21] Appl. No.: 734,167

[22] Filed: Oct. 20, 1976

[30] Foreign Application Priority Data

Oct. 24, 1975 Japan .............................. 50-127418

[51] Int. Cl.$^2$ ...................... C08G 18/14; C08G 18/66
[52] U.S. Cl. ...................... 260/2.5 AM; 260/2.5 AC; 260/2.5 AE; 260/2.5 AJ; 260/2.5 AQ
[58] Field of Search .................. 260/2.5 AC, 2.5 AE, 260/2.5 AM, 2.5 AQ, 2.5 AJ

[56] References Cited

U.S. PATENT DOCUMENTS

| | | | |
|---|---|---|---|
| 2,911,379 | 11/1959 | Parker | 260/2.5 AE |
| 3,455,848 | 7/1969 | Yoncoskie | 260/2.5 AE |
| 3,528,933 | 9/1970 | Johnson | 260/2.5 AM |
| 3,725,319 | 4/1973 | Frisch | 260/2.5 AE |
| 3,901,959 | 8/1975 | Allport | 260/2.5 AM |
| 3,907,721 | 9/1975 | Gurgiolo | 260/2.5 AM |
| 3,925,266 | 12/1975 | Fabris | 260/2.5 AM |
| 3,933,548 | 1/1976 | Anderson | 260/2.5 AE |

FOREIGN PATENT DOCUMENTS 1,023,539  3/1966  United Kingdom .......... 260/2.5 AE

*Primary Examiner*—C. Warren Ivy
*Attorney, Agent, or Firm*—Sughrue, Rothwell, Mion, Zinn and Macpeak

[57] ABSTRACT

A flame- and smoke-retarded, non-shrinkable flexible polyurethane foam is prepared by reacting A. a polyol having at least two active hydrogen atoms and a molecular weight of from 1,000 to 10,000,
B. a low molecular weight polyhydroxyl compound having a molecular weight of from 60 to 700,
C. a polyisocyanate and
D. an ammonium compound which generates ammonia gas at a temperature below 100° C, wherein the equivalent weight ratio of (B) to (A) is ranging from 0.5 to 2.0 and the amount of (D) based upon 100 parts by (A) ranges from 0.5 to 10 parts by weight.

12 Claims, No Drawings

PROCESS FOR PRODUCING A FLAME- AND SMOKE-RETARDED, NON-SHRINKABLE, FLEXIBLE POLYURETHANE FOAM

BACKGROUND OF THE INVENTION

1. Field of the Invention

The present invention relates to a process for producing a flame- and smoke-retarded, non-shrinkable, flexible polyurethane foam.

2. Description of the Prior Art

Polyurethane foams are widely used as sheet and cushioning materials for furnitures, vehicles, aircrafts and ships and materials for cloths and buildings due to the characteristic properties. However, the use of polyurethane foams having flame- and smoke-resistance and low toxicity has recently been demanded for these uses. Moreover, the legal regulation of the use of flame- and smoke-retarded polyurethane foam becomes more strict year after year, and this tendency is noticeable in the polyurethane foams for motorcars, railway vehicles and aircrafts. Heretofore, various attempts have been made with respect to the method for providing the flame-resistance to polyurethane foams. As conventional methods, there is known the use of addition type flame retardants, such as phosphorus-containing compound, halogen- and phosphorus-containing compound, antimony oxide and other metal oxides, or the use of reaction type flame retardants. It is, also, well known to be effective as a means of providing the flame-resistance to the polyurethane foams to introduce a ring structure having a heat resistance, such as isocyanurate ring structure or imide ring structure, into the main chain of the polyurethane molecule. However, in the former case, smoke is generated significantly upon burning, and in the latter case, the foaming stability and general physical properties of the resulting foam are undesirable.

The inventors have already found a method for producing a flame- and smoke-retarded, flexible polyurethane foam by a hot cure system process, wherein a mixture of a polyol and a low molecular weight polyhydroxyl compound is reacted with a polyisocyanate in the absence of flame retardants. The resulting polyurethane foam is judged as self-extinguishing by the burning test (ASTM D-1692-59T). Furthermore, the inventors have found a process for producing a flame- and smoke-retarded flexible polyurethane foam judged as non-burning by the burning test, which comprises reacting a mixture of a polyol and a low molecular weight polyhydroxyl compound with a polyisocyanate in the presence of such a little amount of halogenated phosphoric acid ester that cannot give flame resistance to flexible polyurethane foam in the conventional hot cure system process. The resulting polyurethane foam has a great practical value for industrial uses and also is inexpensive owing to the small amount of the flame retardant. However, the resulting foam using a low molecular weight polyhydroxyl compound has a serious drawback in the shrinkage after the foaming due to the formation of a low proportion of closed cells, and is not a satisfactory foam. Especially, in the process of mass production of slab stock, it is an important problem to solve such shrinkage after foaming, and the means to solve such problem has been earnestly required. In order to prevent the shrinkage of the foam originated by the closed cell, two processes are well known, such as a mechanical method (so called "crushing") and a method wherein a cell opening agent (so called "cell-opener") is compounded to the raw materials. However, the former requires large scale facilities and proper selection of reaction condition, and the latter is apt to be accompanied by heterogeneity of cells at the foaming, and is poor in the foaming stability and in the properties of the resulting foam such as flame- and smoke-resistance. That is, effective processes for producing flexible polyurethane foam having both flame- and smoke-resistance and non-shrinkable property are not, heretofore, known.

SUMMARY OF THE INVENTION

According to the present invention, there is provided a process for producing a flame- and smoke-retarded, non-shrinkable, flexible polyurethane foam which comprises reacting A. a polyol having at least two active hydrogen atoms and a molecular weight of from 1,000 to 10,000, B. a low molecular weight polyhydroxyl compound having a molecular weight of from 60 to 700, C. a polyisocyanate and D. an ammonium compound which generates ammonia gas at a temperature below 100° C, wherein the equivalent weight ratio of (B) to (A) is ranging from 0.5 to 2.0 and the amount of (D) based on 100 parts by weight of (A) is ranging from 0.5 to 10 parts by weight.

It is well known to use an ammonium compound in the preparation of polyurethane foam as a foaming catalyst, a filler, a stabilizing agent and a flame retardant. However, an ammonium compound has never been used for preventing the shrinkage of the flexible polyurethane foam, especially, with such a specified recipe as disclosed in the present invention.

It is, therefore, an aspect of the present invention to provide a process for producing a flame- and smoke-retarded, non-shrinkable, flexible polyurethane foam.

It is another aspect of the present invention to provide flame- and smoke-retarded polyurethane foam without employing any flame retardants, such as phosphorus-containing and halogen-containing compounds.

It is further aspect of the present invention to provide non-shrinkable polyurethane foam having excellent general physical properties not through the mechanical crushing and without any cell opener.

It is still another aspect of the present invention to provide economically non or less toxic polyurethane foam. Because, the ammonium compound to be used in the present invention acts as a catalyst similarly to amine catalyst which causes occasionally some troubles due to its toxicity and odor, so that the foaming procedure according to the present invention can be conducted without or with a very little amount of amine catalyst.

The polyurethane foam obtained in the present invention can be widely used as an industrial material depending upon the density and hardness of the foams. For example, the foam can be used as a raw material for the production of slab stocks for cushioning materials, shock absorbers, furnitures and heat insulators for pipe, and further the foam can be formed into a laminate or formed by the spray-foaming so as to use the foam as a heat-insulating wall, or the foam can be produced in the form of various foamed-in-mold articles.

DESCRIPTION OF THE PREFERRED EMBODIMENTS

As the polyol (A) to be used in the present invention, there may be used polyether polyols having terminal hydroxyl group, polyester polyols having terminal hydroxyl group and polyetherester polyols having terminal hydroxyl group. These polyols can be freely selected depending upon the property of the aimed polyurethane foam. As the polyether polyol, there may be used poly(oxyalkylene) polyols obtained by the addition polymerization of alkylene oxides, such as ethylene oxide, propylene oxide and the like, to initiators containing active hydrogen atoms, such as propylene glycol, glycerin, trimethylolpropane, 1,2,6-hexanetriol, pentaerythritol, ethylenediamine sorbitol, saccharose and the like. Further, as the polyether polyol, there may be used random or block copolymer poly(oxyalkylene) polyols prepared by the sequential addition of two or more of these alkylene oxides to the initiators containing active hydrogen atoms. As the polyester polyol, there may be used polyester polyols obtained by the polycondensation reaction of polybasic acids, such as adipic acid, succinic acid, maleic acid, phthalic acid and the like, with initiators containing active hydrogen atoms, such as ethylene glycol, propylene glycol, butylene glycol and the like, or by the ring opening polymerization of lactones. As the polyetherester polyol, there may be used polyetherester polyols obtained by the poly-condensation reaction of the above described polybasic acids with initiators having ether bond, such as diethylene glycol, triethylene glycol and the like.

In the present invention, polyols having a number average molecular weight of 1,000–10,000 and a hydroxyl value of 20–900 mgKOH/g are generally used. The number average molecular weight and hydroxyl value of the polyol should be varied whether the aimed polyurethane foam is flexible, semi-rigid or rigid. In the production of flexible or semi-rigid polyurethane foam, polyols having a number average molecular weight of 1,000–6,000 and a hydroxyl value of about 20–170 mgKOH/g are used alone or in admixture. In the present invention, polyether polyols are preferably used as the polyol. Among polyether polyols, poly(oxyalkylene) polyol, particularly, poly(oxypropylene) triol or poly(oxyethylene-oxypropylene) triol having a number average molecular weight of 3,000–6,000, which is obtained by the addition polymerization of propylene oxide or ethylene oxide and propylene oxide to glycerin and is generally used in the production of commonly used flexible or semi-rigid polyurethane foam, is preferably used.

As the low molecular weight polyhydroxyl compound (B) to be used in admixture with the polyol (A), there may be used aliphatic alcohol, and heterocyclic aromatic alcohol, each having terminal or branched hydroxyl group. As the aliphatic alcohol, there may be used ethylene glycol, propylene glycol, diethylene glycol, butandiol, glycerin, trimethylolpropane, triethylolpropane, pentaerythritol, 1,2,6-hexanetriol, a low molecular weight polyhydroxyl compound having ether linkage in its main chain obtained by ring opening addition polymerization of ethylene oxide or propylene oxide to a glycerin or trimethylolpropane, etc., and a low molecular weight polyhydroxyl compound having ester linkage in its main chain obtained by condensation reaction of hydroxycarboxylic acid, such as glycolic acid or lactic acid, with glycerin or trimethylolpropane.

As aliphatic alcohols, there may be used aliphatic amino alcohols such as monoethanolamine, diethanolamine, diisopropanolamine, triethanolamine, 2-amino-2-methyl-1,3-propanediol, 2-amino-2-ethyl-1,3-propanediol, tris(hydroxymethyl)aminomethane and N,N,N',N'-tetrakis(2-hydroxypropyl)ethylenediamine. As the heterocyclic aromatic alcohol, there may be used trimethylolmelamine, hexamethylolmelamine and tris(2-hydroxyethyl) isocyanurate. Among them, there may be preferably used glycerin, trimethylolpropane and 2-amino-2-ethyl-1,3-propanediol.

The molecular weight of the low molecular weight polyhydroxyl compound (B) depends ordinarily on the molecular weight of the polyol (A) to be used therewith. In the production of flexible or semi-rigid polyurethane foam, there may be used, alone or in admixture, low molecular weight polyhydroxyl compounds having a molecular weight ranging from 60 to 700 and a hydroxyl value ranging from 160 to 600 mgKOH/g. The equivalent weight ratio of the low molecular weight polyhydroxyl compound (B) to the hydroxyl group equivalent of the polyol (A) is ranging from 0.5 to 2.0. When the amount of the compound (B) is less than 0.5, the resulting foam becomes flammable, and when said amount becomes more than 2.0, a favorable foam cannot be obtained and the resulting foam is liable to show a considerable shrinkage and further becomes flammable. Especially, the use amount of from 0.7 to 1.5 equivalent weight ratio is preferable.

As the polyisocyanate (C) to be used in the present invention, there may be generally used tolylene diisocyanate. Particularly, tolylene diisocyanate, wherein 2,4- and 2,6-isomers of isocyanate group are mixed in a mixture ratio of 80/20 or 65/35 (weight ratio), is preferable in view of a low cost and utility. Crude tolylene diisocyanate may be used. As the other polyisocyanates, there may be used pure or crude diphenylmethane diisocyanate, chlorophenyl-2,4-diisocyanate, p-phenylene diisocyanate, xylylene diisocyanate, polymethylenepolyphenyl isocyanate and the like, or mixtures of these polyisocyanates and tolylene diisocyanate.

The amount of polyisocyanate used based on the total amount of the polyol and the other compound having active hydrogen atoms, that is, the isocyanate index (NCO index) is in the range of 80–130, but when considering the balance of the flame resistance and the smoke resistance to the general physical properties of the produced polyurethane foam, the isocyanate index is preferred to be in the range of 95–110.

As the ammonium compound (D) to be used in the present invention, ammonium compounds which generate ammonia gas at a temperature below 100° C are preferable to attain the object of the present invention. The temperature at the foaming of polyurethane foam is generally about 100° C, that is, the ammonium compound to be used in the present invention is one which decomposes at a temperature below the foaming temperature.

As the ammonium compound described above, there may be used ammonium carbonate, ammonium hydrogencarbonate, ammonium carbamate, ammonium hydrogencarbonate carbamate, ammonium citrate and sodium ammonium hydrogenphosphate. Among them, the ammonium compounds other than sodium ammonium hydrogenphosphate generate ammonia gas and carbon dioxide gas or ammonia gas, carbon dioxide gas and water by heating. Ammonia and water have active hydrogen atoms and react with the polyisocyanate to take part in the chain extending and the crosslinking reactions in the preparation of polyurethane foam. Carbon dioxide gas generated by the decomposition of the ammonium compound acts as a blowing agent at the foaming step and also has an excellent effect for preventing the resulting foam from shrinking. Thus, the ammonium compound acts as a catalyst and a blowing agent under an exothermic reaction condition of the foaming step and also has an excellent effect for giving the flame- and smoke-resistance to the resulting polyurethane foam.

The amount of the ammonium compound (D) to be used in the present invention is within the range of from 0.5 to 10 parts by weight, preferably from 1.0 to 5.0 parts by weight, based on 100 parts by weight of the polyol (A). The use of more than 10 parts by weight of ammonium compound is not preferable, because too much ammonia gas and water generate and the density of the resulting foam remarkably decreases.

As the catalyst to be used in the present invention, there can be used commonly used catalysts in the art. The catalysts include organometallic compounds, such as stannous octoate, dibutyltin dilaurate and the like; and amines, such as triethylenediamine, triethylamine, N-methylmorpholine, N-ethylmorpholin, tetramethylbutanediamine, pentamethyldiethylenetriamine, bis-($\beta$-dimethylaminoethyl) ether and the like. The above described catalysts can be used alone or in admixture. The amount of catalyst to be used in the present invention is not particularly limited and can be varied in a wide range. However, the catalyst is generally used in an amount of 0.001–5.0 parts by weight, preferably 0.01–2.0 parts by weight, based on 100 parts by weight of the polyol (A) to be used in the production of polyurethane foam. Of course, more than 5 parts by weight of the catalyst can be used, but the use of such large amount is not economic.

The surfactant or cell stabilizer to be used in the present invention is commonly known silicone surfactant, and is selected from, for example, polydialkylsiloxanes and polysiloxane-polyalkylene oxide block copolymers. The kind and use amount of the silicone surfactant are not limited as far as the object of the present invention is attained. The use amount of the silicone surfactant is 0.005–3.0 parts by weight, preferably 0.05–2.0 parts by weight, based on 100 parts by weight of the polyol (A). Further, non-silicone surfactants also can be used as a surfactant. The non-silicone surfactants are compounds generally known as an emulsifier, and include sodium ricinoleicsulfonate; sodium salts of fatty acids; amine salts of fatty acids, for example, oleic acid diethanolamine and stearic acid diethanolamine; alkali metal salts or ammonium salts of sulfonic acids, such as dodecabenzenesulfonic acid and dinaphthylmethane disulfonic acid, fatty acid, such as ricinoleic acid, and polymeric fatty acid; and the like.

In the present invention, a blowing agent which serves to control the density of the resulting polyurethane foam, may be used. The blowing agent is water or a volatile liquid having a low boiling point. The volatile liquid having a low boiling point includes, for example, methylene chloride, chloroform, monofluorotrichloromethane, monochlorodifluoromethane, dichlorodifluoromethane and the like. These blowing agents may be used alone or in admixture. When water is used as a blowing agent, it is preferred to use water in an amount of not more than 5.0 parts by weight based on 100 parts by weight of the polyol (A).

The production of the polyurethane foams according to the present invention can be carried out by the usually conducted process. For example, one shot process, wherein the polyisocyanate is added to a homogeneous mixture of the polyol, the catalyst, the surfactant and other assistants to cause reaction and foaming, and so-called prepolymer process, wherein a part or the total amount of the polyol is previously reacted with the total amount of the polyisocyanate to form a prepolymer and then the prepolymer is mixed with the other components to cause foaming, are usually adopted.

The polyurethane foams obtained in the present invention have a density of 0.015–0.050 g/cm$^3$. If desired, the density of the foams is further controlled by adding water, the other blowing agent or a low molecular weight polyhydroxyl compound, by changing the addition amount of the ammonium compound or by selecting the kind of the polyol or the polyisocyanate, whereby flexible and semi-rigid polyurethane foams can be produced without departing from the object of the present invention.

The following examples are given for the purpose of illustration of this invention and are not intended as limitations thereof. In the examples, "parts" mean by weight unless otherwise indicated.

EXAMPLE 1

To 100 parts of poly(oxypropylene) triol having a number average molecular weight of about 3,000 and a hydroxyl value of 56 (trademark: GP 3000, made by Sanyo Chemical Industries, Ltd.) were added successively 4.4 parts (1 equivalent weight based on the hydroxyl group equivalent of the triol) of trimethylolpropane previously dissolved in 3.0 parts of water 0.2 parts of stannous octoate, 2.0 parts of ammonium hydrogencarbonate and 1.5 parts of a silicone surfactant (trademark: SRX-253, made by Toray Silicone Co., Ltd.), and the resulting mixture was thoroughly stirred for about 30 seconds by means of a propeller stirrer. When the resulting homogeneous mixture was stirred at a high speed together with 50.8 parts (NCO index: 100) of tolylene diisocyanate TDI-80 (2,4-isomer/2,6-isomer=80/20), a reaction began to start, and the reaction mixture became creamy in about 17 seconds (cream time). When the creamy mixture was immediately poured into a paper mold, the creamy mixture began to foam, and after 130 seconds (rise time), healthy bubbles were generated and the rising of foam was completed.

The resulting flexible polyurethane foam was an excellent non-shrinkable foam having uniform cells, all of which were substantially open cells with a very little proportion of closed cells, and after-treatment, such as crushing treatment, was not necessary in order to maintain the foamed structure. The polyurethane foam had a burning extent of 30 mm according to the burning test (ASTM D-1692-59T) and showed excellent self-extinguish properties. The general physical properties of the resulting foam were measured by JIS K6301 and 6401. The foam had a density of 0.0250 g/cm$^3$, a hardness of 6.4 Kg, a tensile strength of 0.85 Kg/cm$^2$, an elongation of 150% and a tear strength of 0.56 Kg/cm.

COMPARATIVE EXAMPLE 1

The foaming procedure was conducted according to Example 1, except that ammonium hydrogencarbonate was not used and 0.1 part of triethylenediamine was used as an amine catalyst. In the forming procedure, the cream time and the rise time were 16 seconds and 150 seconds respectively, however healthy bubbles are not observed.

The resulting foam had a large amount of closed cell, and when the foam was left to stand after the completion of the foaming reaction, the foam shrank gradually and was formed into a shrunk foam after about 1 hour. Even when the shrunk foam was subjected to a crushing treatment, the original foamed structure cannot be restored, and the shrunk foam could not be used in the measurement of the general physical properties and the burning test. Therefore, a test specimen was prepared by foaming the same raw material under the same condition as described above, except that the crushing was conducted after about 5 minutes to the resulting foam to maintain the foamed structure. The resulting specimens was self-extinguishing and had a burning extent of 33 mm according to the burning test. The foam obtained had a density of 0.030 g/cm$^3$, a hardness of 7.5 kg, a tensile strength of 0.94 Kg/cm$^2$, an elongation of 130% and a tear strength of 0.48 Kg/cm.

From the results obtained in both of Example 1 and Comparative Example 1, it was concluded that the ammonium compound to be used in the present invention had an efficient catalytic function comparable with that of amine catalyst and a remarkable effect for preventing the shrinkage of the resulting foam. Moreover, the foam according to the present invention had no defect in general physical properties and had appreciably some merits in the low density and in the improved elongation.

EXAMPLES 2-4

The same foaming procedure as described in Example 1 was conducted, except that ammonium carbamate, ammonium carbonate or sodium ammonium hydrogenphosphate was respectively used instead of ammonium hydrogencarbonate. All of the resulting polyurethane foams were non-shrinkable flexible foams having good cell structure and substantially no closed cell.

The foaming behavior in the foaming process and the results of the burning test of the resulting foam are shown in Table 1.

Table 1

| Ammonium compound | Example 2 ammonium carbamate | Example 3 ammonium carbonate | Example 4 sodium ammonium hydrogenphosphate |
|---|---|---|---|
| Forming behavior | | | |
| Cream time (second) | 7 | 5 | 20 |
| Rise time (second) | 100 | 60 | 165 |
| Healthy bubbles | present | present | present |
| Shrinkage | absent | absent | absent |
| Burning test | | | |
| Burning extent (mm) | 27 | 26 | 31 |
| Judged | self-extinguishing | self-extinguishing | self-extinguishing |

EXAMPLE 5

The same foaming procedure as described in Example 1 was conducted, except that the amount of tolylene diisocyanate TDI-80 was changed to 55.6 parts (NCO index: 110) and 0.1 part of an amine catalyst of a mixture of bis($\beta$-dimethylaminoethyl) ether and dipropylene glycol (70:30) was added. In the foaming procedure, the cream time was 14 seconds, the rise time was 115 seconds and healthy bubbles were generated. The resulting polyurethane foam was a flexible and non-shrinkable one. According to the burning test, the resulting foam had a burning extent of 28 mm and was self-extinguishing. From the measurement of the physical properties, the foam had a density of 0.024 g/cm$^3$, a hardness of 5.7 Kg, a tensile strength of 0.54 Kg/cm$^2$, an elongation of 110% and a tear strength of 0.38 Kg/cm.

EXAMPLES 6 and 7

The same foaming procedure as described in Example 1 was conducted, except that glycerin or a polyhydroxyl compound containing ester linkage was used as a low molecular weight polyhydroxyl compound instead of trimethylolpropane. The resulting foam was a flexible polyurethane foam having uniform open cells.

The foaming behavior and the results of the burning test are shown in Table 2.

Table 2

| Low molecular weight polyhydroxyl compound | Example 6 glycerin, 3.0 parts | Example 7 low molecular weight polyhydroxyl compound containing ester linkage 1), 10.1 parts |
|---|---|---|
| Foaming behavior | | |
| Cream time (second) | 19 | 20 |
| Rise time (second) | 113 | 151 |
| Healthy bubbles | present | present |
| Shrinkage | absent | absent |
| Burning test | | |
| Burning extent (mm) | 42 | 38 |
| Judged | self-extinguishing | self-extinguishing |

1) a product obtained by reacting 1 mole of trimethylolpropane with 3 moles of glycolic acid.

The physical properties of the resulting foams are shown in Table 3.

Table 3

| | | Example 6 | Example 7 |
|---|---|---|---|
| Physical properties of the foam | | | |
| Density | (g/cm$^3$) | 0.0265 | 0.0301 |
| Hardness | (Kg) | 4.4 | 4.8 |
| Tensile strength | (Kg/cm$^2$) | 0.63 | 0.70 |
| Elongation | (%) | 170 | 150 |
| Tear strength | (Kg/cm) | 0.54 | 0.60 |

EXAMPLE 8

The same foaming procedure as described in Example 1 was conducted, except that 100 parts of poly(oxypropyleneoxyethylene) triol having a number average molecular weight of about 5,000 and a hydroxyl number of 36, in which the proportion of the primary hydroxyl group to total hydroxyl group was from 60 to 70% (trademark: FA-703, made by Sanyo Chemical Industries, Ltd.) was used as a polyol instead of GP 3000 and 3.0 parts of ammonium hydrogencarbonate and 46.7 parts (NCO index: 110) of tolylene diisocyanate TDI-80 were used. The cream time was 13 seconds and the rise time was 127 seconds accompanying healthy bubbles. The resulting polyurethane foam was a flexible, non-shrinkable one having good cell structure.

According to the burning test, the foam had a burning extent of 30 mm and was self-extinguishing. The foam had a density of 0.0256 g/cm$^3$, an elongation of 280% and a tear strength of 0.66 Kg/cm.

EXAMPLE 9

The same foaming procedure as described in Example 1 was conducted, except that poly(oxypropylene-oxyethylene) triol having a number average molecular weight of 3,000, a hydroxyl number of 56, in which the proportion of the primary hydroxyl group to total hydroxyl group was about 62% (trademark: Propylan 333, made by Daiichi Kogyo Seiyaku Co., Ltd.) was used as a polyol instead of GP 3000. In the foaming procedure, healthy bubbles were observed, and the cream time was 14 seconds and the rise time was 88 seconds. The resulting polyurethane foam was a flexible, non-shrinkable one having good cell structure.

According to the burning test, the resulting foam was non-burn. The foam had a density of 0.0268 g/cm$^3$, a hardness of 4.0 Kg, a tensile strength of 0.75 Kg/cm$^2$, an elongation of 190% and a tear strength of 0.53 Kg/cm.

EXAMPLE 10

In the similar manner as described in Example 1, a foaming procedure was conducted, except that 3.90 parts (equal equivalent weight to polyol) of 2-amino-2-ethyl-1,3-propanediol was used as a low molecular weight polyhydroxyl compound instead of trimethylolpropane. Healthy bubbles were observed in the forming procedure and the cream time was 10 seconds and the rise time was 105 seconds. The resulting polyurethane foam was a flexible, non-shrinkable one having good cell structure. According to the burning test, the resulting foam had a burning extent of 57 mm and was self-extinguishing. The foam had a density of 0.0296 g/cm$^3$, a hardness of 8.0 Kg, a tensile strength of 1.02 Kg/cm$^2$, an elongation of 120% and a tear strength of 0.48 Kg/cm.

EXAMPLE 11

A foaming procedure was conducted according to Example 1, except that 1.0 part of water, 3.02 parts of glycerin as a low molecular weight polyhydroxyl compound, 2.0 parts (1.5 equivalent weight to polyol) of 2-amino-2-ethyl-1,3-propanediol, 0.2 part of stannous octoate, 3.0 parts of ammonium hydrogencarbonate, 1.5 parts of silicone surfactant F-121 (made by Shinetsu Silicone Co., Ltd.) and 45.3 parts (NCO index: 110) of tolylene diisocyanate TDI-80 (2,4-isomer/2,6-isomer=80/20) were used. Healthy bubbles were observed in the forming procedure and the cream time was 11 seconds and the rise time was 98 seconds. The resulting polyurethane foam was a flexible, non-shrinkable one having good cell structure.

According to the burning test, the resulting foam had a burning extent of 26 mm and was self-extinguishing. The foam had a density of 0.0463 g/cm$^3$, a hardness of 9.4 Kg, a tensile strength of 1.00 Kg/cm$^2$, an elongation of 130% and a tear strength of 0.05 Kg/cm.

What is claimed is:

1. A process for producing a flame- and smoke-retarded, non-shrinkable, flexible polyurethane foam, which comprises reacting
   A. a polyol having at least two active hydrogen atoms and a molecular weight of from 1,000 to 10,000,
   B. a low molecular weight polyhydroxyl compound having a molecular weight of from 60 to 700,
   C. an organic polyisocyanate, and
   D. an ammonium compound which prevents shrinkage of said flexible polyurethane foam upon production, which generates ammonia gas at a temperature below 100° C and which decomposes at a temperature beneath the temperature of the reaction to provide said polyurethane foam, said ammonium compound also functioning as a catalyst for the reaction, wherein the equivalent weight ratio of the low molecular weight polyhydroxyl compound (B) to the polyol (A) is ranging from 0.5 to 2.0 and the amount of the ammonium compound (D) based on 100 parts by weight of the polyol (A) is ranging from 0.5 to 10 parts by weight.

2. The process according to claim 1, in which the polyol (A) is at least one compound selected from the group consisting of polyether polyol, polyester polyol and polyetherester polyol.

3. The process according to claim 2, in which the polyether polyol is poly(oxyalkylene) polyol obtained by polymerizing alkylene oxide with polyhydric alcohol.

4. The process according to claim 3, in which the poly(oxyalkylene) polyol is at least one compound selected from the group consisting of poly(oxypropylene) triol and poly(oxyethylene-oxypropylene) triol.

5. The process according to claim 1, in which the low molecular weight polyhydroxyl compound (B) is an aliphatic alcohol.

6. The process according to claim 5, in which the aliphatic alcohol is at least one compound selected from the group consisting of ethylene glycol, propylene glycol, diethylene glycol, butanediol, glycerin, trimethylolpropane, triethylolpropane, pentaerythritol, 1,2,6-hexanetriol, a polyol having a molecular weight of from 60 to 700 containing ether linkage and a polyol having a molecular weight of from 60 to 700 containing ester linkage.

7. The process according to claim 5, in which the aliphatic alcohol is at least one compound selected from the group consisting of monoethanolamine, diethanolamine, diisopropanolamine, triethanolamine, 2-amino-2-methyl-1,3-propanediol, tris(hydroxymethyl)aminomethane and N,N,N',N'-tetrakis(2-hydroxypropyl)ethylenediamine.

8. The process according to claim 1, in which the ammonium compound (D) is at least one compound selected from the group consisting of ammonium carbonate, ammonium hydrogencarbonate, ammonium carbamate, ammonium hydrogencarbonate carbamate, ammonium citrate and sodium ammonium hydrogenphosphate.

9. The process according to claim 1, in which the amount of the ammonium compound (D) to be used is within the range of from 1.0 to 5.0 parts by weight based on 100 parts by weight of the polyol (A).

10. The process of claim 1, wherein said polyurethane foam is free of any flame retardant.

11. The process of claim 1, which comprises reacting a system consisting of components (A) to (D).

12. The process according to claim 1, in which the low molecular weight polyhydroxyl compound (B) is at least one compound selected from the group consisting of trimethylolmelamine, hexamethylol melamine and tris(2-hydroxyethyl) isocyanurate.

* * * * *